United States Patent [19]

Kronseder

[11] 4,244,462

[45] Jan. 13, 1981

[54] BOTTLE TABLE FOR LABELING MACHINES

[76] Inventor: Hermann Kronseder, Regensburger Strasse, 8404 Wörth, Fed. Rep. of Germany

[21] Appl. No.: 79,608

[22] Filed: Sep. 27, 1979

[30] Foreign Application Priority Data

Sep. 30, 1978 [DE] Fed. Rep. of Germany ....... 2842794

[51] Int. Cl.$^3$ .............................. B65G 45/02

[52] U.S. Cl. .............................. 198/500; 198/344; 198/377; 308/187

[58] Field of Search ............... 198/344, 377, 478, 500; 156/567, 571, DIG. 13, DIG. 26; 184/7 R, 7 A; 308/187

[56] References Cited

FOREIGN PATENT DOCUMENTS 1258784 1/1968 Fed. Rep. of Germany .

*Primary Examiner*—Jeffrey V. Nase

*Attorney, Agent, or Firm*—Ralph G. Hohenfeldt

[57] ABSTRACT

A bottle transporting table, somewhat like a spoked wheel, revolves about a vertical axis. A plurality of vertical shafts are angularly spaced around the rim region of the wheel and the top end of each shaft has a bottle supporting turn table fastened to it. The shafts are journaled on a thrust bearing and a radial bushing fixed in the top of the rim region and the bottom ends of the shafts extend into a cavity at the bottom of the rim which is created by fitting complementarily with a lower stationary ring. A pair of vertical bores or ducts are formed in the rim parallel to and radially spaced from the turntable shafts and their bearings. A seal forms an annular channel over the bearings and bores. A nozzle fed from a pump projects lubricating oil into one of the bores adjacent each shaft as these bores orbit with the rim. The channel enables the lubricant to be conducted to the bearings and the other bore enables lubricant to be recirculated back to a reservoir.

10 Claims, 3 Drawing Figures

BOTTLE TABLE FOR LABELING MACHINES

The invention relates to a revolving table such as is used in bottle labeling machines and the like.

A revolving bottle table has the function of moving bottles which are standing upright on circumferentially spaced apart turntables past the various treatment stations such as a label application station. To this end the bottles are pressed against the turntables by rams pushing axially downwardly on the bottle head. The bearings of the turntables are thus under heavy stress resulting from the high thrust force of the rams, the continual oscillatory movements of the turntables and the unfavorable operating conditions caused by fluid filled bottles bursting on the turntables, cleaning of the bottle table with water and so forth. Consequently, a highly effective system for lubrication of the bearings of the turntables is required.

In a known revolving table of the above-mentioned kind, channels leading to the bearings of each turntable communicate with lubricating nipples or fittings, located on the outside of the revolving upper table part, through which grease can be forced as in German Gebrauchsmuster No. 74 30 532. This design necessitates frequent manual refilling of grease while the revolving bottle table is standing still, which moreover, is very time-consuming due to the large number of lubricating nipples. Even with frequent proper lubrication it may happen that the grease hardens in one of the channels, resulting in premature destruction of a bearing. Also, due to the unfavorable operating conditions, even if the bearings are well-sealed, the grease may wash out, thereby causing bearing malfunctions.

SUMMARY OF THE INVENTION

A general object of the invention is to reduce maintenance expense substantially and reduce lubrication-related malfunctions in the turntables which orbit on a revolving table.

A revolving table in which the new lubrication system may be used comprises an upper ring or wheel turning on a vertical shaft and a stationary lower ring over which the rim region of the upper ring turns and which interfaces with the upper ring. Several turntable disks for supporting bottles, respectively, are supported on shafts which are in angular spaced relation or disposed circumferentially around the upper ring. The shafts each have an axial thrust bearing and a radial bearing supporting them for rotation in the upper ring. A sealed recess is formed at the interface of the upper and lower rings. A lubricant spray nozzle is installed in the lower ring to project a jet of lubricant through the recess and through oil feed ducts as the turntables rotate and orbit on the upper ring part.

Due to the stationary arrangement of the spray nozzle, it can be fed with pressurized oil continuously or intermittently at any desired time during operation, that is, with the upper ring part revolving. A certain quantity of lubricating oil is thereby supplied to each bearing at least once during one revolution of the upper part. Maintenance servicing can be done during machine operation and is limited to occasional checking of the oil level, refilling of oil or the like, depending on the method of oil supply. Constant-circulation oiling can be realized with simple means, as in accordance with a feature of the invention, a return line opening into a reservoir is connected to the stationary lower part, and the spray nozzle is supplied with pressurized oil from the reservoir by means of an oil pump. In this case it is merely necessary to change the oil from time to time. Independently of this, in a revolving bottle table according to the invention, as much oil as desired may be supplied to the bearings of the orbiting turntables continuously and completely automatically, so that even under extremely unfavorable operating conditions no bearing malfunctions are likely to occur.

A particularly simple construction results if, according to a feature of the invention, all oil ducts which receive the sprayed oil and conduct it to the bearings are arranged on a common pitch circle. In this case a single spray nozzle is sufficient for supplying oil to all turntables.

According to another feature of the invention, the oil ducts or bores are directed substantially vertically downward and the spray nozzles substantially vertically upward. Hence, a quantatively sufficient transfer of the lubricating oil from the nozzle into the oil ducts is obtained even at high speed rotation of the upper part.

An especially good oil supply to the bearings is obtained if, according to another feature of the invention, the oil feed ducts lie radially inside of the axial bearings and radial bearings. In this way the centrifugal force resulting from rotation of the upper part is utilized to transport oil between the oil duct bore and bearings.

To ensure good oil circulation, particularly in continuous-circulation oiling, it is desirable if, according to a feature of the invention, at least one oil drain opening connected with the radial bearings and/or the axial bearings is formed in the revolving upper part for each turntable. If then, the oil drain openings lie radially outside of the axial bearings and radial bearings, the centrifugal force at revolving upper part will contribute to the oil drain.

A particularly inexpensive construction results if, according to two additional features of the invention, the oil feed duct openings and/or oil drain openings are formed by the lower openings of vertically standing bores provided in the revolving upper part, and if the bores are open at the top of the revolving upper part and between each turntable and in the upper part a seal ring is inserted to form a channel leading to the bearings. Then, for maintenance purposes it is only necessary to remove the turntable and possibly the seal ring whereupon the oil feed duct and oil drain openings and the respective channels become readily accessible.

According to another feature of the invention, the oil which returns from the bearings discharges into the stationary bottom part below the opening of the spray nozzle so unnecessary oil circulation is avoided.

Another advantageous feature of the invention is to have the oil pump driven synchronously with the revolving upper part. This results in the oil pressure adapting to the speed of rotation of the upper part so that sufficient oil supply to the bearings is ensured even at very short overlap times or dwell times between the spray nozzle and the input opening of the oil feed duct.

For the more detailed explanation of the invention an embodiment is described below with reference to the drawings.

DESCRIPTION OF A PREFERRED EMBODIMENT

Figure 1:
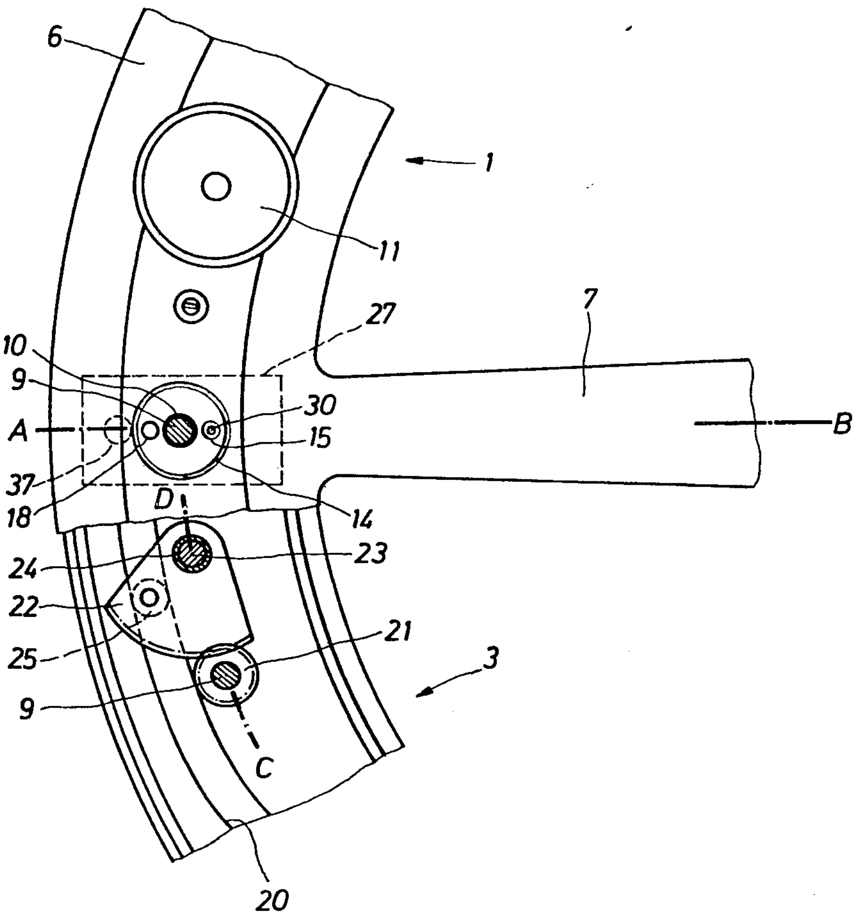
FIG. 1 shows a top view of a detail of a bottle table, partly in section.
Figure 2:
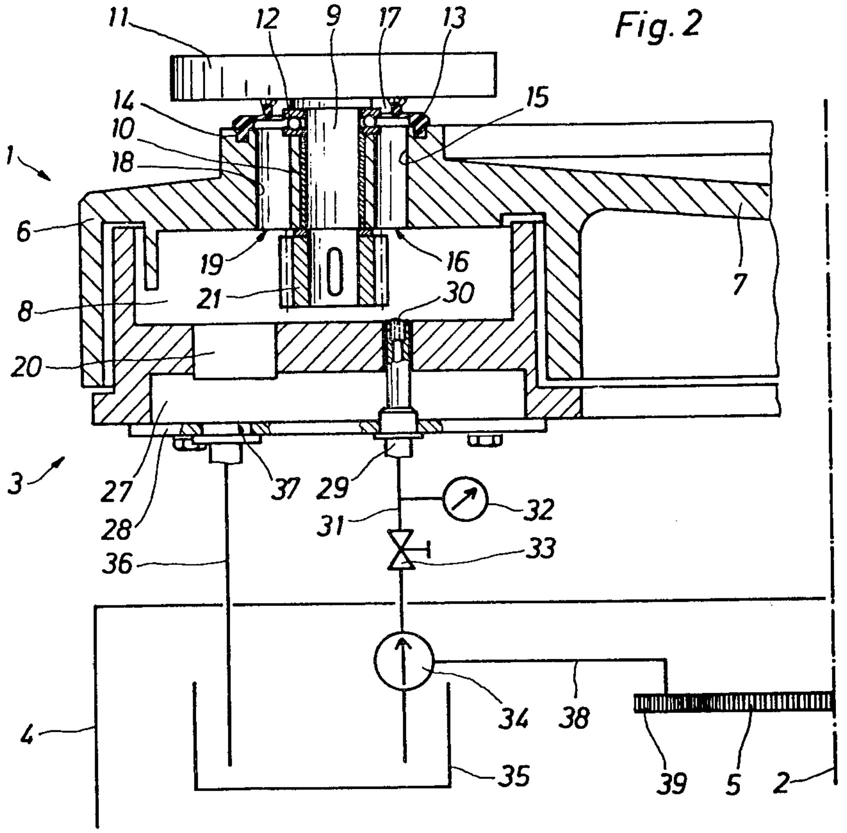
FIG. 2 is a section taken on the line A-B in FIG. 1 together with a schematic representation of the oil supply.
Figure 3:
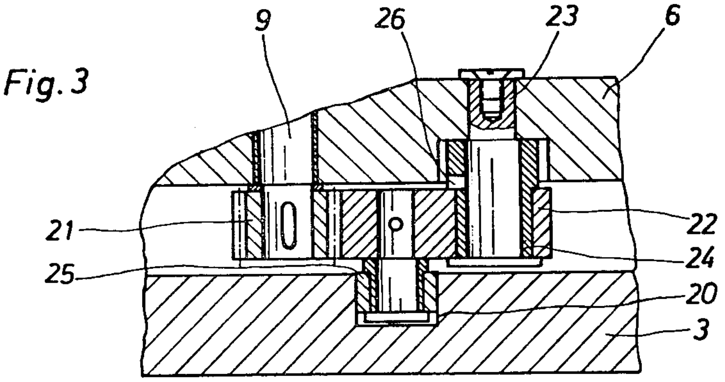
FIG. 3 is a partial section taken on the line C-D in FIG. 1.

The bottle table according to FIGS. 1-3 comprises an upper revolving part 1 that can be looked upon as being the rim portion of a wheel and is fastened on a vertical shaft whose axis is indicated by the reference numeral 2, and a bottom part 3, which is secured to stationary columns, not shown. Axis 2 will be called shaft 2 hereinafter since the axis is symbolic of the shaft. Shaft 2 is rotatably mounted in the housing 4 of a labeling machine and is provided with a gear 5 by which it is driven, thus setting the upper part 1 in rotation. The upper part 1 consists of a ring body 6 of U-shaped cross section open toward the bottom, several radially extending spokes 7, and a hub, not shown, but which is fastened to shaft 2. The stationary bottom part 3 is ring-shaped and also has a U-shaped cross section, but is open toward the top. It protrudes in between the U-shaped legs of ring body 6 from below, so that an annular cavity 8 is formed. The cavity is closed off from the outside by the seals formed between the vertical U-legs of ring body 6 and the bottom part 3.

In the horizontal leg of the ring body 6 of the upper part 1, several vertical shafts 9, evenly distributed over the latter's circumference, are respectively journaled for rotation in radial bearings 10 in the form of bushings. At the top end of each of these shafts 9 is secured a turntable disk 11 serving to support a bottle for rotation as the bottles revolve or orbit around the shaft 2 axis. An axial thrust ball bearing 12 is disposed concentric with shaft 9 between ring body 6 and each turntable 11. The thrust bearing is required because the bottles have an axially directed force applied to them by means which are not shown. In addition, an elastic seal ring 13 is fitted concentrically with shaft 9, between the ring body 6 and each turntable 11. It is secured in an annular groove 14 in ring body 6 and has its upper sealing lips pressed against the underside of turntable 11.

Radially inside of each turntable shaft 9 and also of the axial bearings 12 and radial bearings 10, there is formed in revolving ring body 6 of upper part 1 a first vertical straight bore 15 which serves as an oil feed duct. All bores or ducts 15 have the same diameter and lie on a common pitch circle whose diameter is correspondingly smaller than that of the pitch circle of the turntables 11. The opening, formed on the underside of the horizontal leg of ring body 6, of each first straight bore 15 serves as oil feed or inlet opening 16, while the straight bore 15 itself serves as a channel or duct for the oil supply to the two bearings 10 and 12 of turntable 11. Contiguous to the upper opening of each bore 15 is an annular channel 17, defined substantially by the correspondingly formed seal ring 13, the underside of turntable 11 and the top of ring body 6 and leading directly to the axial bearing 12. Thus, the oil can advance through the annular gap between the shaft 9 and the lower race of the thrust bearing 12 to the radial bearing 10, which may be provided with lubricant conducting grooves. Excess oil emerges from the underside of the radial bearing 10.

Radially outside of each shaft 9 and also of the axial bearing 12 and radial bearing 10 there is formed in the ring body 6 of the upper part 1 a second vertical straight bore 18. All bores 18 lie on a common pitch circle whose diameter is greater than that of the pitch circle of turntables 11. The opening, formed on the underside of the horizontal leg of ring body 6, of every other bore 18 serves as oil drain opening 19, while the straight bore 18 itself serves as a channel or duct for the removal of the excess lubricating oil not taken up by the radial bearing 10 and the axial bearing 12. Connection of bore 18 with the axial bearing 12 is established by way of the annular channel 17 within seal 13. The oil feed or inlet openings 16 as well as the oil drain openings 19 open into the cavity 8 and oil then drains into the oil pan formed between the vertical U-legs of bottom part 3.

In the horizontal leg of stationary bottom part 3, a continuous cam groove 20 is formed. The cam groove is one of the components involved in rotating the turntables 11. For this purpose there is fastened to the lower end of each shaft 9 a pinion 21 into which the teeth of a segment 22 meshes. The segment is mounted for rotation on the ring body 6 of upper part 1 by means of a stud shaft 23 and a bushing 24 and the segment engages in groove cam 20 by means of a cam roller 25. Bushing 24 has an opening 26 through which oil accumulated on the top of segment 22 can penetrate into bushing 24.

In the underside of stationary bottom part 3 a rectangular recess 27 is formed whose depth is such that it intersects with the cam groove 20. Cavity 8 communicates with recess 27. Toward the bottom, recess 27 is closed off by a cover 28. A nozzle is fixed in holder 29. A spray nozzle 30 in the holder has its upper discharge end aimed into the orbital path of the oil inlet openings 16 at the lower ends of the bores or ducts 15. An oil jet issuing from nozzle 30 vertically upward thus enters the oil inlet opening 16 and is conducted up the first straight bore 15 to the bearings. The opening of nozzle 30 is approximately flush with the top side of the horizontal leg of bottom part 3, which in the region of nozzle holder 29 is provided with a straight bore. The position of recess 27 and nozzle 30 on the stationary bottom part 3 is selected so that in this region the space between nozzle 30 and the oil inlet ends 16 of the bores 17 orbiting over the nozzle are not obstructed by the toothed segments 22 and therefore the oil can flow unhindered from nozzle 30 into the oil inlet openings 16.

Nozzle 30 is supplied with pressurized oil from a tube 31 which has a pressure gauge 32 and a shutoff and regulating valve 33 leading to a continuously delivering oil pump 34. Oil pump 34 draws oil from a reservoir 35. An oil return tube 36 is coupled to a discharge opening 37 in the cover 28 for returning oil from recess 27 to the reservoir. Oil pump 34 is schematically represented by a shaft 38 on which there is a pinion 39 meshing with gear 5 on shaft 2. Oil pump 34 is thus driven synchronously with the upper part 1 of the bottle table.

The operation of the above-described bottle table is as follows: If in operation, that is, with the upper part 1 rotating, the shutoff and regulating valve 33 is opened, lubricating oil is transported from oil filled reservoir 35 to the spray nozzle 30 under positive pressure developed by the pump 34. The nozzle sends a focused oil jet vertically upward onto the orbit of the oil inlet openings 16 of bores or ducts 15, so that each oil inlet opening 16, as it passes the spray nozzle 30, admits oil, which because of its jet pressure is conveyed upwardly through bore 15 into the annular channel 17. There the oil is moved substantially radially outward due to the centrifugal force of the revolving upper part 1, and the oil enters the axial bearing 12 and the radial bearing 10. The bulk of the oil continues to flow radially outward and is subsequently conducted through bore 18 for flowing out of oil drain opening 19 at the lower end of the bore into the cavity 8. The returning oil flows into cavity 8 in bottom stationary part 3 and into cam groove 20 and then continues into the recess 27 from which it goes through discharge opening 37 and the return line 36 back into the reservoir 35. During the time between passage of two successive oil inlet openings 16 the oil jet issues from the spray nozzle 30 impinging on the underside of the ring body 6 which scatters the oil for wetting and lubricating the pinions 21 and toothed segments 22, from which a part of the oil runs through the opening 26 into the bushing 24. Thus the control elements for the turntables 11 are well lubricated.

By appropriate choice of the diameter of the oil inlet openings 16, of the spray nozzle 30 opening size and of the gear pump 33 capacity or respectively its drive, the bearings of each turntable 11 will receive the quantity of oil that is commensurate with the size of the machine. Of course, oil flow rate can also be controlled with regulating valve 33.

I claim:

1. A revolving table for transporting articles such as bottles, said table including a wheel-like member supported for revolving about a vertical axis, a plurality of bearing means mounted in said member radially spaced from said axis and arranged angularly around said axis, a vertically disposed shaft in the respective bearing means, a bottle-supporting turntable mounted on the upper ends of the respective shafts, a stationary member above which said wheel member revolves and which cooperates with said wheel member to define an annular recess in which a cam is arranged and which has elements controlled by said cam for rotating said turntables, and improved means for lubricating said bearings wherein:

said wheel-like member is provided with a first duct adjacent each shaft, said duct having an inlet opening presented toward said recess and an outlet opening in communication with said bearing means, and at least one nozzle mounted in said stationary member for projecting lubricant into said inlet openings of said respective first ducts successively while said wheel-like member revolves.

2. The table as in claim 1 wherein said wheel-like member is provided with a second duct adjacent each shaft, said second duct having an inlet opening in communication with said bearing means and an outlet opening in communication with said recess for draining excess lubricant.

3. The table as in claim 1 wherein all of said inlet openings to said first ducts, respectively, are arranged on a common pitch circle.

4. The table as in claim 1 wherein said inlet openings of said first ducts, respectively, are located radially inwardly from said shaft and bearing means relative to the axis of said wheel-like member.

5. The table as in claim 2 wherein said second ducts are generally vertically disposed and are located radially outside of said shaft and bearing means relative to the axis of said wheel-member.

6. The table as in any of claims 1, 2, 3, 4 or 5 including:

seal elements interposed between said wheel-like member and said turntables, respectively, said elements defining internal channels circumjacent the shaft and bearing means for conducting lubricant from said first duct to said bearings.

7. The table as in claim 2 wherein:

said bearings means comprise a radial bearing through which the respective shafts extend and an axial thrust bearing on which the respective shafts are supported, the outlet opening of said first duct and the inlet opening of said second duct each being adjacent said bearings, a seal element interposed said wheel-like member and said turntables, respectively, said seal elements defining internal channels circumjacent said shafts and bearings, said outlet opening of the first duct and said inlet opening of the second duct being in communication with said seal element channel to thereby provide a lubricant flow path from said first duct to said bearings and to said second duct.

8. The table as in any of claims 1, 2, 3, 4, 5 or 7 including:

a pump having an inlet and an outlet, a lubricating fluid reservoir and means for coupling the inlet of said pump to the reservoir, means for coupling the outlet of said pump to said nozzle, means defining a cavity in said stationary member below said recess, said cam means comprising a slot which puts said recess and cavity in fluid communication for returning lubricating fluid which has been delivered to said bearing to said cavity, and means for conducting lubricating fluid from said cavity back to said reservoir.

9. The table as in claim 8 wherein said nozzle extends through said cavity and to said recess.

10. The table as in claim 8 including means for driving said pump at a rate proportional to the rate at which said table revolves.

* * * * *